(12) United States Patent
Tadokoro et al.

(10) Patent No.: US 12,468,074 B2
(45) Date of Patent: Nov. 11, 2025

(54) PLASMONIC BOROPHENE NANORIBBON METAL-INSULATOR-METAL STRUCTURE FOR QUANTUM IMAGING

(71) Applicant: Toyota Motor Engineering & Manufacturing North America, Inc., Plano, TX (US)

(72) Inventors: Yukihiro Tadokoro, Ann Arbor, MI (US); Ziqi Yu, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 145 days.

(21) Appl. No.: 18/389,925

(22) Filed: Dec. 20, 2023

(65) Prior Publication Data

US 2025/0208323 A1 Jun. 26, 2025

(51) Int. Cl.
| | |
|---|---|
| *G02B 5/00* | (2006.01) |
| *B82Y 20/00* | (2011.01) |
| *G02F 1/00* | (2006.01) |
| *G02F 1/19* | (2019.01) |
| *G06N 10/40* | (2022.01) |

(52) U.S. Cl.
CPC .............. *G02B 5/008* (2013.01); *B82Y 20/00* (2013.01); *G02F 1/0018* (2013.01); *G02F 1/19* (2013.01); *G06N 10/40* (2022.01); *G02F 2202/30* (2013.01); *G02F 2202/36* (2013.01)

(58) Field of Classification Search
CPC ....... G02B 5/008; B82Y 20/00; G02F 1/0018; G02F 1/19; G02F 2202/30; G02F 2202/36; G06N 10/40
See application file for complete search history.

(56) References Cited

U.S. PATENT DOCUMENTS

| | | | |
|---|---|---|---|
| 9,494,715 B2 * | 11/2016 | Lee | ............... G02F 1/011 |
| 10,312,389 B2 | 6/2019 | Chanda et al. | |

(Continued)

FOREIGN PATENT DOCUMENTS

| | | |
|---|---|---|
| CN | 109166933 A | 1/2019 |
| JP | 2018121273 A | 8/2018 |

OTHER PUBLICATIONS

Yanagi et al. "All-Optical Wide-Field Selective Imaging of Fluorescent Nanodiamonds in Cells, In Vivo and Ex Vivo", ACS nano 15.8. 2021.

(Continued)

*Primary Examiner* — Michelle M Iacoletti
*Assistant Examiner* — Maher Yazback
(74) *Attorney, Agent, or Firm* — Christopher G. Darrow; Darrow Mustafa PC (57) ABSTRACT

Systems and methods described herein relate to implementing quantum imaging. In one embodiment, method includes forming a first substrate that is optically transparent and electrically conductive; forming a second substrate, residing on the first substrate, that is optically transparent and electrically insulative; forming a first borophene nanoribbon array electrically coupled to a first electrode, both residing on the second substrate; forming a third substrate, residing in the second substrate, that is optically transparent and (Continued)

electrically insulative; and forming a second borophene nanoribbon array electrically coupled to a second electrode, both residing on the third substrate.

20 Claims, 5 Drawing Sheets

(56) References Cited

U.S. PATENT DOCUMENTS

| | | | | |
|---|---|---|---|---|
| 2010/0301308 | A1* | 12/2010 | Ahn | B82Y 20/00 |
| | | | | 257/14 |
| 2011/0233382 | A1* | 9/2011 | Solin | H10F 39/107 |
| | | | | 250/214 R |
| 2012/0121820 | A1* | 5/2012 | Kaplan | B82Y 40/00 |
| | | | | 264/447 |
| 2017/0059891 | A1* | 3/2017 | Giessen | G02B 1/002 |
| 2019/0317173 | A1* | 10/2019 | Connolly | G01R 33/00 |
| 2020/0278414 | A1* | 9/2020 | Walsworth | G01R 33/26 |
| 2021/0263116 | A1* | 8/2021 | Bar-Gil | G01R 33/032 |
| 2022/0299439 | A1 | 9/2022 | Zerulla | |
| 2023/0332942 | A1* | 10/2023 | Shimatani | G01R 29/0878 |
| 2024/0192530 | A1* | 6/2024 | Badcock | G02F 1/035 |
| 2024/0210878 | A1* | 6/2024 | Varshney | G03H 1/2294 |
| 2025/0185515 | A1* | 6/2025 | Shimatani | H10N 15/15 |

OTHER PUBLICATIONS

Chen et al. "Simultaneous imaging of magnetic field and temperature using a wide-field quantum diamond microscope", EPJ Quantum Technology 8.1. 2021.

Hadfield, R. H. "Single photon detectors for optical quantum information applications", Nature photonics 3.12. 2009.

Nobunaga et al. "Reconstruction for spatially distributed single-pixel imaging based on pattern filtering", IEEE Signal Processing Letters 25.5. 2018.

Nishibori et al. "Periodic networked imaging with nanoscale sensor nodes via two-layered time-division access", IEEE Internet of Things Journal 9.8. 2021.

Duarte et al. "Single-pixel imaging via compressive sampling", IEEE signal processing magazine 25.2. 2008.

Takhar et al. "A new compressive imaging camera architecture using optical-domain compression", Computational Imaging IV. vol. 6065. 2006.

Zerom et al. "Entangled-photon compressive ghost imaging", Physical Review A, 84. 2011.

Thorlabs. "Spatial Light Modulators", Retrieved from the Internet: <https://www.thorlabs.com/newgrouppage9.cfm?objectgroup_id=10378>, retrieved Dec. 11, 2023. 4 pages.

Dereshgi et al. "Anisotropic localized surface plasmons in borophene", Optics Express 28.11. 2020.

* cited by examiner

610 — Electron Beam Evaporation (E-beam Evaporation) May Be Used to Deposit a First Substrate, such as an Indium Tin Oxide (ITO) Layer, that is Optically Transparent and Electrically Conductive. In Some Embodiments, the First Substrate May Be Deposited on a Diamond Substrate, such as One Containing NV Centers.

620 — E-beam Evaporation May Be Used to Deposit a Second Substrate, such as a Silicon Dioxide ($SiO_2$) Layer, that is Optically Transparent and Electrically Insulative on the First Substrate.

630 — E-beam Lithography May Be Used to Define a Nanoribbon Array Pattern on the Second Substrate. In Addition, Photolithography May Be Used to Define a Metal Electrode Pattern on the Second Substrate (E.G., By Use of a Photomask).

640 — E-beam Evaporation May Be Used to Deposit the Metal (E.G., Gold, Copper, Silver, Platinum, Nickel) for the Electrode, Followed by Application of a Wet Lift-off Solution (E.G., Acetone) to Reveal the Electrode.

650 — Chemical Vapor Deposition May Be Used to Deposit Borophene on the Second Substrate. In Some Embodiments, Graphene May Be Used Instead of Borophene.

660 — An Application of a Wet Lift-off Solution (E.G., Acetone) May Be Used to Reveal the Borophene Nanoribbon Array.

670 — Sputtering may be used to deposit a third substrate, such as strontium titanate ($SrTiO_3$) layer, that is optically transparent and electrically insulative on the second substrate.

680 — Steps 530-560 May Be Repeated with Respect to the Third Substrate Instead of the Second Substrate.

690 — Any Necessary Cleaning Processes May Be Applied.

FIG. 6

PLASMONIC BOROPHENE NANORIBBON METAL-INSULATOR-METAL STRUCTURE FOR QUANTUM IMAGING

TECHNICAL FIELD

The subject matter described herein relates, in general, to optical switches for quantum imaging and, more particularly, to plasmonic-controlled transparency enabled by a metal-insulator-metal structure incorporating borophene nanoribbons.

BACKGROUND

A dense layer of nitrogen-vacancy (NV) centers near the surface of a diamond can be interrogated in a widefield optical microscope to produce spatially resolved maps of local quantities such as magnetic field, electric field, and lattice strain, providing potentially valuable information about a sample or device placed in proximity. Spatial mapping of these stray fields can be achieved via a fixed dense layer of NV centers imaged onto a camera.

SUMMARY

In one embodiment, a nanophotonic device is disclosed. The nanophotonic device includes a first substrate that is optically transparent and electrically conductive; a second substrate, residing on the first substrate, that is optically transparent and electrically insulative; a first borophene nanoribbon array electrically coupled to a first electrode, both residing on the second substrate; a third substrate, residing in the second substrate, that is optically transparent and electrically insulative; and a second borophene nanoribbon array electrically coupled to a second electrode, both residing on the third substrate.

In one embodiment, a method for implementing a nanophotonic device is disclosed. In one embodiment, the method includes forming a first substrate that is optically transparent and electrically conductive; forming a second substrate, residing on the first substrate, that is optically transparent and electrically insulative; forming a first borophene nanoribbon array electrically coupled to a first electrode, both residing on the second substrate; forming a third substrate, residing in the second substrate, that is optically transparent and electrically insulative; and forming a second borophene nanoribbon array electrically coupled to a second electrode, both residing on the third substrate.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIG. 6 illustrates one example of a method for fabricating an optical switching structure.

DETAILED DESCRIPTION

Systems, methods, and other embodiments associated with quantum imaging, such as wide-field imaging of photoluminescence by NV centers within a diamond substrate, are described herein.

In particular, an optical switching structure is presented that may reside on the diamond substrate and use borophene nanoribbon arrays within a metal-insulator-metal (MIM) for the purpose of achieving plasmonically-induced transparency. Based on such an optical switching structure, reconstruction of the image captured within the diamond substrate can then occur through the further use of single-pixel optical detectors and an image reconstruction module as described herein.

Figure 1A:
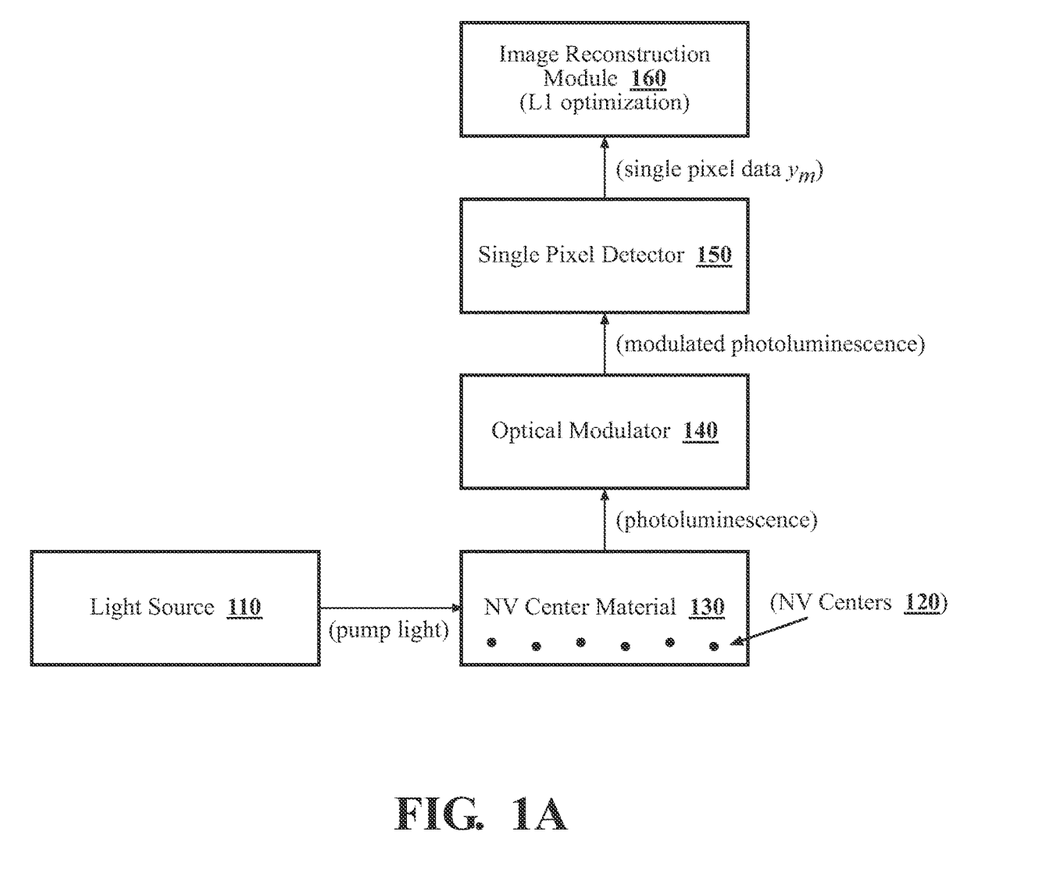
FIG. 1A illustrates an example of a system for wide-field imaging of photoluminescence by NV centers in a diamond substrate.

With respect to FIG. 1A, an example of a system for wide-field imaging of photoluminescence is shown. A light source 110 (e.g., a 546 nm "green" light) may be used to excite NV centers 120 in the NV center material 130. The presence of an electrical or magnetic field (not shown) may cause the NV centers 120 to undergo photoluminescence (e.g., a 670 nm "red" light), which may be processed with an optical modulator 140 (e.g., a spatial light modulator). The output of the optical modulator may then be captured by a single-pixel optical detector 150. The data obtained from the single-pixel optical detector may then be processed via an image reconstruction module 160 with L1 optimization to form an image.

Figure 1B:
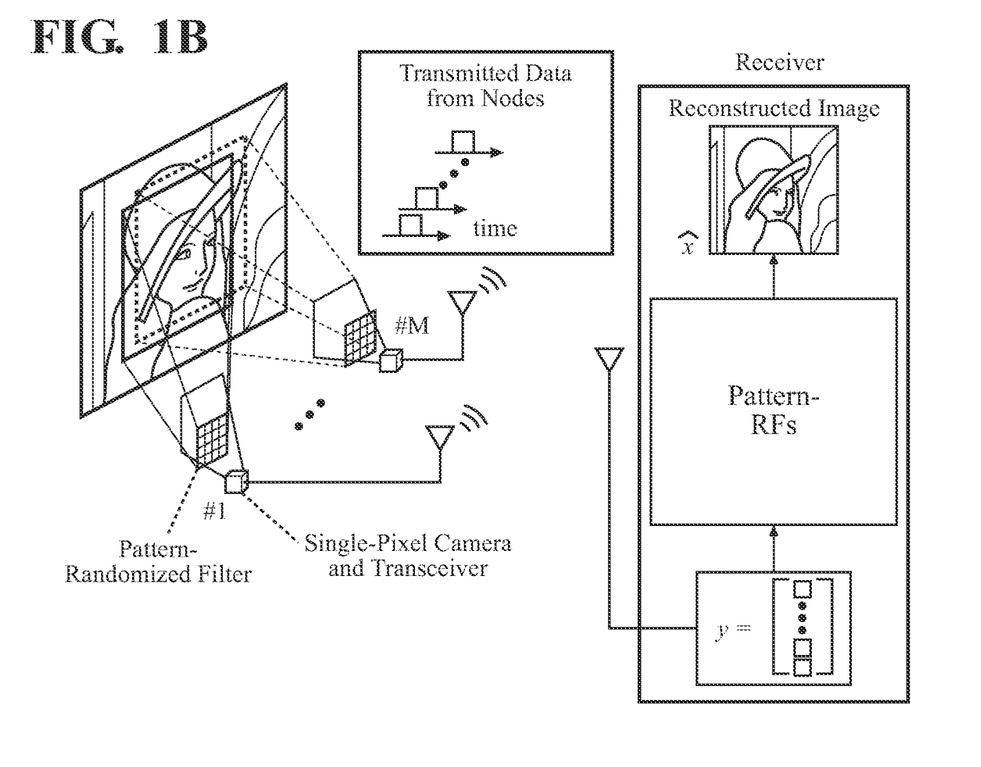
FIG. 1B illustrates a further example of a system for wide-field imaging of photoluminescence.

For example, as shown in FIG. 1B the imaging system of FIG. 1A may be composed of many "tiny" nodes each with a pattern-randomized filter (implemented by an optical modulator) and a single-pixel camera and transceiver, where the nodes are indexed as m=1, ..., M. The target image $X \in \mathbb{R}^{\sqrt{n} \times \sqrt{n}}$ may be further expressed as a column vector $x \in \mathbb{R}^{n \times 1}$ relation $(x)_l = (i-1)\sqrt{n} + j = (X)_{(i,j)}$ (such that the element (i,j) of image X is equal to element $l=(i-1)\sqrt{n}+j$ of the vector x). Each optical modulator may be characterized as a pattern-randomized filter (pattern-RF). Through pattern-RFs, the image $x_m$ observed at node m may be transformed into a single pixel, $y_m := A_m x_m{}'$, where $A_m = \{0,1\} \in \mathbb{R}^{n \times 1}$ denotes the pattern-RF and $a^t$ is the transpose of a. An observation vector $y := [y_1, \ldots, y_m]^t \in \mathbb{R}^{M \times 1}$ may then be obtained based on the combined data from the single-pixel detectors.

A target reconstruction may be based on y, where the sparse representation ŝ of the reconstructed image x̂ may be calculated by solving the convex optimization:

$$\hat{s} = \min \|s\|_1 \text{ s.t. } y = A\Psi^{-1}s, \quad \text{Equation (1)}$$

where $s:=\Psi x \in \mathbb{R}^{n \times 1}$ denotes the sparse representation of the original image x, $\Psi \in \mathbb{R}^{n \times n}$ denotes a transformation matrix, and $A:=[A_1, \ldots, A_M]^T \in \mathbb{R}^{M \times n}$ denotes a matrix representation of the pattern-RFs. 3

Figure 2:
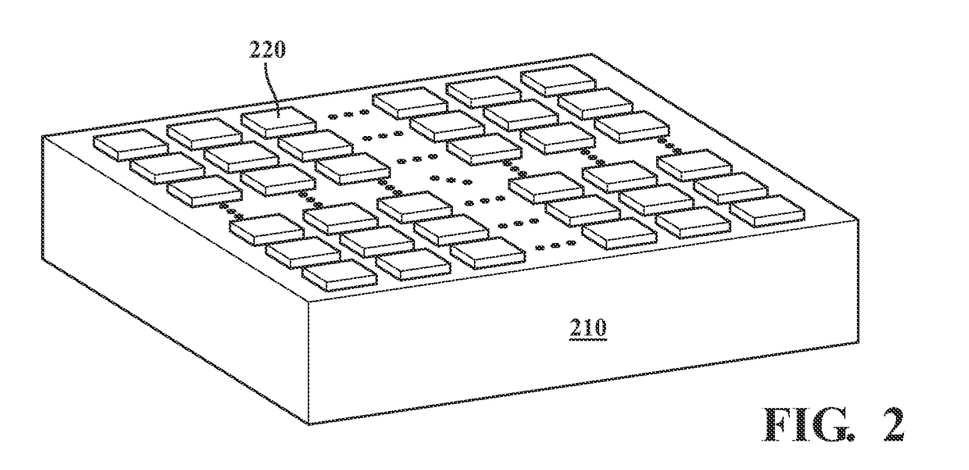
FIG. 2 illustrates one embodiment of an array of optical switching structures within which the systems and methods described herein may operate.
Figure 3:
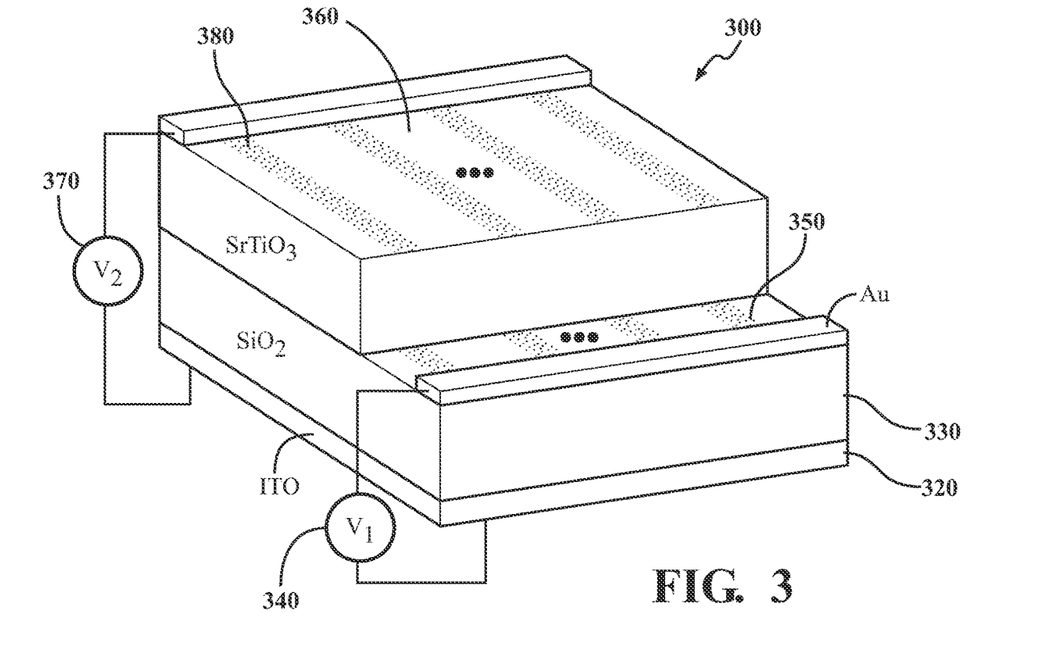
FIG. 3 illustrates one embodiment of an optical switching structure within which the systems and methods described herein may operate.

With respect to FIG. 2, an array of optical switching structures 220 is shown that may reside on (or be otherwise optically coupled to) the surface of a diamond substrate 210. An example of the optical switching structure is shown in FIG. 3. As shown, the optical switching structure 300 may be comprised of a first substrate 320, such as an indium tin oxide layer, that is conductive and transparent. In some embodiments, the first substrate 320 may be formed on diamond substrate 310 (not shown), such as diamond substrate 210. A second substrate 330, such as a silicon dioxide ($SiO_2$) layer, that is insulative and transparent may be formed on the first substrate 320. Next, a first electrode 340 and a first borophene nanoribbon array 350 may be formed on the second substrate 330. A third substrate 360, such as a strontium titanate ($SrTiO_3$) layer, that is insulative (e.g., dielectric constant of 300) and transparent may then be formed on the second substrate 330. A second electrode 370 and a second borophene nanoribbon array 380 may then be formed on the third substrate 360.

Figure 4:
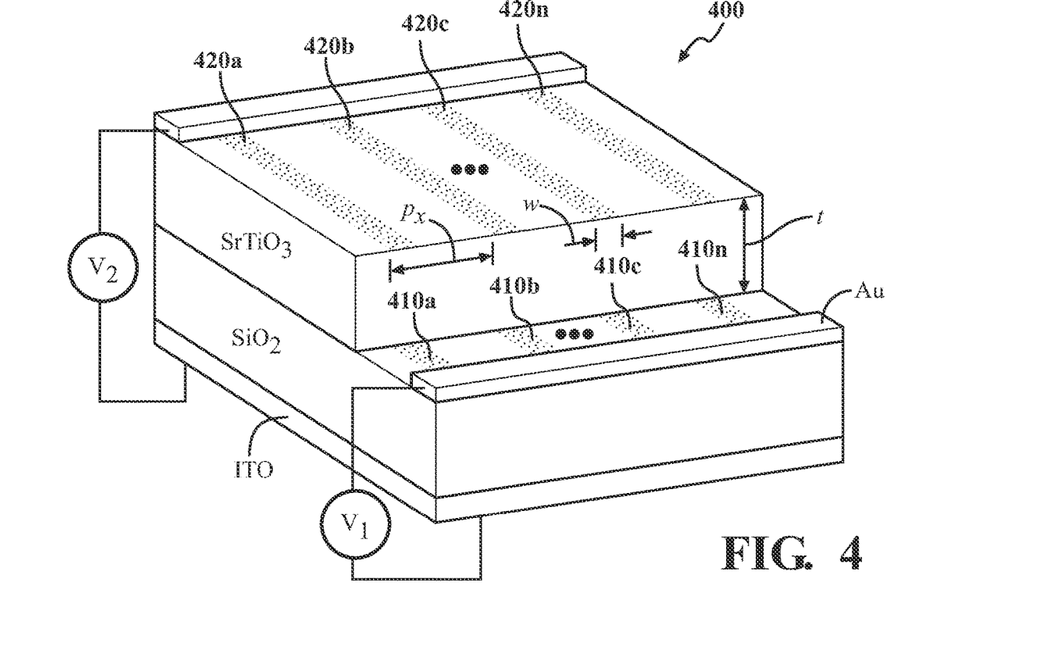
FIG. 4 illustrates one embodiment of a nanoribbon array structure/parameters within which the systems and methods described herein may operate.

In FIG. 4, an example of a nanoribbon array structure/parameters 400 is shown that may be used with optical switching structure 300. With respect to a first borophene nanoribbon array 410, each element of the array (e.g., 410a-n) may have a width w. In addition, each element of the first borophene nanoribbon array 410 may be separated from each other by a distance $p_x$. A second borophene nanoribbon array 420 may also be similarly constructed where each element (e.g., 420a-n) has a width w and where each element is separated by a distance $p_x$ from any neighboring element. Moreover, the first borophene nanoribbon array 410 and the second borophene nanoribbon array 410 may be separated by a distance t.

By selection of the array parameters $p_x$, w, t, and an application of bias voltages $V_1$ and $V_2$ to obtain desired carrier densities $n_s$ in each borophene nanoribbon array, plasmonically-induced transparency (PIT) within the optical switching structure 330 may be achieved. PIT is a nanophotonic phenomenon that involves the interaction between electromagnetic waves and plasmonic resonances in metallic nanostructures. In PIT, transparency may arise due to an interaction between a bright plasmon and dark plasmon mode in metallic nanostructures. A bright plasmon is a resonant plasmon mode that can absorb and scatter light, while the dark mode is a non-radiative mode that does not easily couple to light. When these two modes are coupled, they can create a spectral window where the absorption of light is significantly reduced or transparent at a particular wavelength.

For example, to implement PIT with optical switching structure 300, $p_x$ may be set to 60 nm, w may be set to 8 nm, and t may be set to 10 nm. Based on such array parameters, bias voltages $V_1$ and $V_2$ may be selected (e.g., $V_1=0$ V, $V_2=0$ V) such that in a first filtering state the desired carrier densities $n_0$ are $8 \times 10^{19}$ $m^{-2}$ (e.g., intrinsic property) for both the first borophene nanoribbon array 410 and the second borophene nanoribbon array 420, such that $\Delta n_s=0$ between the first and second borophene nanoribbon arrays 410 and 420. Similarly, for a second filtering state the desired carrier density $n_1$ of the first borophene nanoribbon array 410 may be set to $6 \times 10^{19}$ $m^{-2}$ via bias voltage $V_1$, (e.g., $V_1=-13.5$ V), while the desired carrier density $n_2$ of the second borophene nanoribbon array 420 may be set to $10 \times 10^{19}$ $m^{-2}$ via bias voltage $V_2$ (e.g., $V_2=13.3$ V), such that $\Delta n_s=4 \times 10^{19}$ $m^{-2}$ between the first and second borophene nanoribbon arrays 410 and 420.

The required bias voltage may be estimated according to:

$$V_i = \frac{e(n_i - n_0)}{C_{ox}} + \frac{\Delta \mu_c}{e}, \quad \text{Equation (1)}$$

where i=1 or 2, $e=1.602 \times 10^{-19}$ C is the electron charge, $$C_{ox} = \frac{\varepsilon_{SrTiO_3} \varepsilon_0}{t}$$

is the capacitance of the $SrTiO_3$ layer ($\varepsilon_{SrTiO_3}=300$ and $\varepsilon_0=8.854 \times 10^{-12}$ $CV^{-1}m^{-1}$), and $\Delta \mu_c$ is the difference between the chemical potentials of the first borophene nanoribbon array 410 and the second borophene nanoribbon array 420 obtained from $\mu_i=\hbar v_F(\pi n_i)^{1/2}$ ($\hbar=1.05 \times 10^{-34}$·s and Fermi velocity $v_F=1 \times 10^6$ $ms^{-1}$). Due to the very high static dielectric constant of $SrTiO_3$, a 10 nm thin layer is able to sustain the required bias voltages mentioned above. Similar high-dielectric-constant material such as $TiO_2$ (dielectric constant of 80) may be used as an alternative, but requires higher bias voltages (e.g., $V_1=-50.6$ V and $V_2=49.8$ V).

Figure 5:
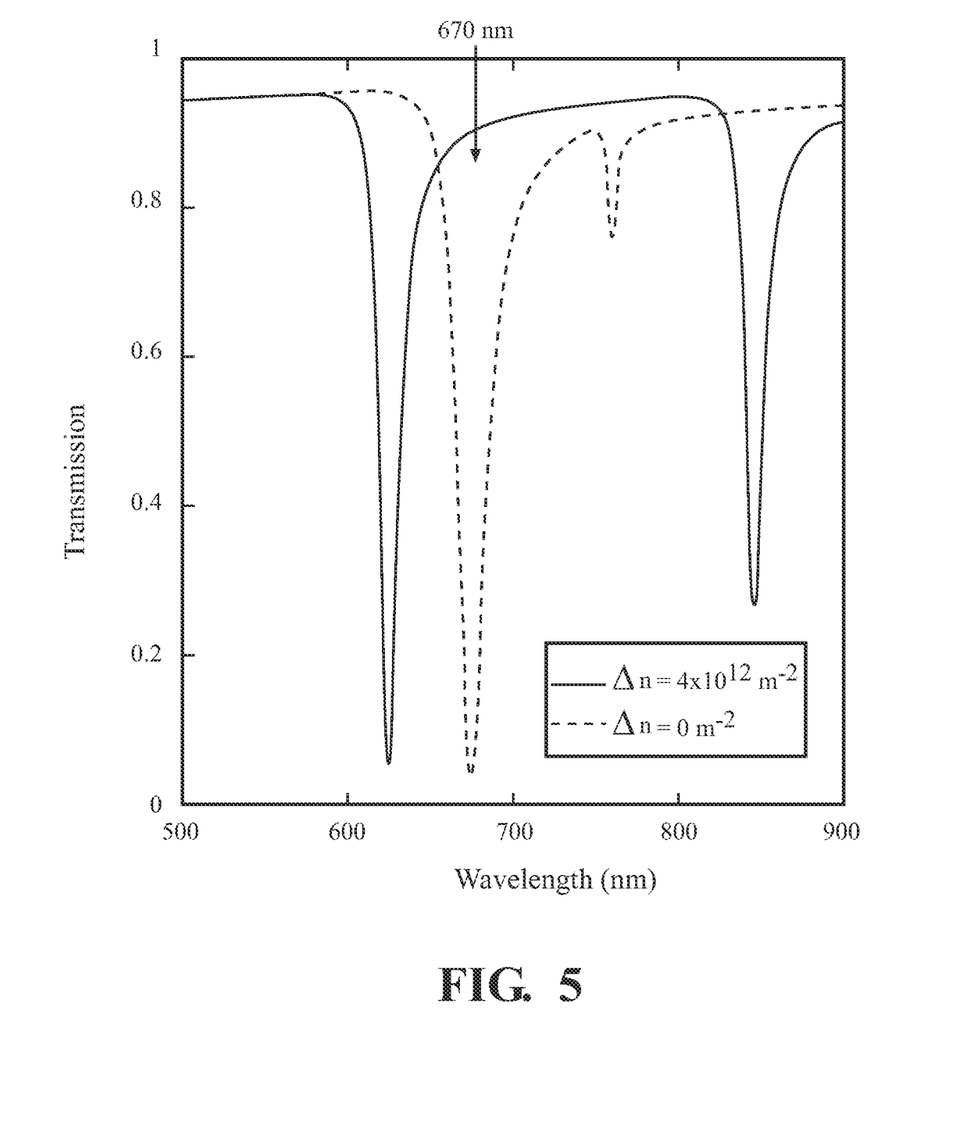
FIG. 5 illustrates one example of the filtering states of an optical switching structure.

By switching between the first filtering state or second filtering state through modulation of the bias voltages $V_1$ and $V_2$, optical switching structure 300 may optically filter signals as shown in FIG. 5. For example, when optical switching structure 300 is in the first filtering state where $\Delta n_s=0$, optical signals at 670 nm may pass through optical switching structure 300 (e.g., as illustrated by high transmission in FIG. 5). If though optical switching structure 300 is in the second filtering state where $\Delta n_s=4 \times 10^{19}$ $m^{-2}$, optical signals at 670 nm may not pass through optical switching structure 300 (e.g., as illustrated by near-zero transmission in FIG. 5).

FIG. 6 illustrates a flowchart of a method 600 that is associated with fabricating an optical switching structure. Method 600 will be discussed from the perspective of the optical switching structure 300 of FIG. 3 in view of the nanoribbon array structure/parameters 400 of FIG. 4. While method 600 is discussed in combination with optical switching structure 300 in view of nanoribbon array structure/parameters 400, it should be appreciated that the method 600 is not limited to being implemented within optical switching structure 300 and nanoribbon array structure/parameters 400 but is instead one example of an optical switching structure that may implement method 600. For example, other nanoribbon array structure/parameters that allow for PIT via the optical switching structure 300 may also be implemented via method 600.

At step 610, electron beam evaporation (e-beam evaporation) may be used to deposit a first substrate, such as an indium tin oxide (ITO) layer, that is optically transparent and electrically conductive. In some embodiments, the first substrate may be deposited on a diamond substrate, such as one containing NV centers.

At step 620, e-beam evaporation may be used to deposit a second substrate, such as a silicon dioxide ($SiO_2$) layer, that is optically transparent and electrically insulative on the first substrate.

At step 630, e-beam lithography may be used to define a nanoribbon array pattern on the second substrate. In addition, photolithography may be used to define a metal electrode pattern on the second substrate (e.g., by use of a photomask).

At step 640, e-beam evaporation may be used to deposit the metal (e.g., gold, copper, silver, platinum, nickel) for the electrode, followed by application of a wet lift-off solution (e.g., acetone) to reveal the electrode.

At step 650, chemical vapor deposition may be used to deposit borophene on the second substrate. In some embodiments, graphene may be used instead of borophene.

At step 660, an application of a wet lift-off solution (e.g., acetone) may be used to reveal the borophene nanoribbon array.

At step 670, sputtering may be used to deposit a third substrate, such as strontium titanate ($SrTiO_3$) layer, that is optically transparent and electrically insulative on the second substrate.

At step 680, steps 530-560 may be repeated with respect to the third substrate instead of the second substrate.

At step 690, any necessary cleaning processes may be applied.

Accordingly, using method 600 an optical switching structure with a nanoribbon array structure/parameters (e.g., optical switching structure 300 with nanoribbon array structure/parameters 400) may be fabricated. Further, such an optical switching structure can be used as an optical modulator. For example, optical switching structure 300 with nanoribbon array structure/parameters 400 may be used as an optical modulator for the imaging system described in FIGS. 1A-1B. In such an embodiment, the image to be reconstructed may be generated by photoluminescence of NV centers 120 in NV center material 130. Moreover, NV center material 130 may be coupled to a number of "tiny" nodes each with a pattern-randomized filter (implemented by an instance of optical switching structure 300 with nanoribbon array structure/parameters 400) and a single-pixel camera, which then allows for image reconstruction via Equation (1).

As another example, while the above systems and methods have been described with respect to the use of borophene ribbon arrays (e.g., where optical transparency is desired below 1500 nm), an optical switching structure may be similarly implemented via graphene ribbon arrays (e.g., where optical transparency is desired at or above 1500 nm).

It should be noted that while the above examples were provided with an NV center material using diamond, other wide-bandgap materials containing defects such as Silicon Carbide (SiC), Gallium Nitrogen (GaN), and hexagonal boron nitride (hBN) may also be used as the center material with respect to the systems and methods disclosed herein.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components, or processes described above may be realized in hardware or a combination of hardware and software and may be realized in a centralized fashion in one processing system or in a distributed fashion where different elements are spread across several interconnected processing systems. Any kind of processing system or another apparatus adapted for carrying out the methods described herein is suited. A typical combination of hardware and software may be a processing system with computer-usable program code that, when being loaded and executed, controls the processing system such that it carries out the methods described herein. The systems, components, or processes also may be embedded in a computer-readable storage, such as a computer program product or other data programs storage device, readable by a machine, tangibly embodying a program of instructions executable by the machine to perform methods and processes described herein. These elements also may be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that may contain or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC, or ABC).

Aspects herein may be embodied in other forms without departing from the spirit or essential attributes thereof. Accordingly, reference should be made to the following claims, rather than to the foregoing specification, as indicating the scope hereof.

What is claimed is:

1. A nanophotonic device, comprising
a first substrate that is optically transparent and electrically conductive;
a second substrate, residing on the first substrate, that is optically transparent and electrically insulative;
a first borophene nanoribbon array electrically coupled to a first electrode, both residing on the second substrate;
a third substrate, residing on the second substrate, that is optically transparent and electrically insulative; and
a second borophene nanoribbon array electrically coupled to a second electrode, both residing on the third substrate.

2. The nanophotonic device of claim 1, wherein the first borophene nanoribbon array and the second borophene nanoribbon array are structured to cause plasmonically-induced transparency if a first bias voltage is applied to the first electrode and a second bias voltage is applied to the second electrode.

3. The nanophotonic device of claim 2, wherein the plasmonically-induced transparency occurs at 670 nm.

4. The nanophotonic device of claim 2, wherein the plasmonically-induced transparency occurs below 1500 nm.

5. The nanophotonic device of claim 1, wherein the first substrate is composed of an indium tin oxide layer.

6. The nanophotonic device of claim 5, wherein the second substrate is composed of a silicon dioxide layer.

7. The nanophotonic device of claim 6, wherein the third substrate is composed of a calcium fluoride layer.

8. The nanophotonic device of claim 1, wherein the first substrate is deposited on a diamond substrate.

9. The nanophotonic device of claim 1, wherein the first substrate is optically coupled to a diamond substrate.

10. The nanophotonic device of claim 1, further comprising:
a single pixel detector optically coupled to the third substrate.

11. A method for constructing a nanophotonic device comprising:
forming a first substrate that is optically transparent and electrically conductive;
forming a second substrate, residing on the first substrate, that is optically transparent and electrically insulative;
forming a first borophene nanoribbon array electrically coupled to a first electrode, both residing on the second substrate;
forming a third substrate, residing on the second substrate, that is optically transparent and electrically insulative; and
forming a second borophene nanoribbon array electrically coupled to a second electrode, both residing on the third substrate.

12. The method of claim 11, wherein the forming of the first borophene nanoribbon array and the forming of the second borophene nanoribbon array further includes structuring the first borophene nanoribbon array and the second borophene nanoribbon array to cause plasmonically-induced transparency if a first bias voltage is applied to the first electrode and a second bias voltage is applied to the second electrode.

13. The method of claim 12, wherein the plasmonically-induced transparency occurs at 670 nm.

14. The method of claim 12, wherein the plasmonically-induced transparency occurs below 1500 nm.

15. The method of claim 11, wherein the first substrate is composed of an indium tin oxide layer.

16. The method of claim 15, wherein the second substrate is composed of a silicon dioxide layer.

17. The method of claim 16, wherein the third substrate is composed of a calcium fluoride layer.

18. The method of claim 11, wherein the first substrate is deposited on a diamond substrate.

19. The method of claim 11, further comprising:
forming an optical coupling between the first substrate and a diamond substrate.

20. The method of claim 11, further comprising:
forming an optical coupling between the third substrate and a single pixel detector.

* * * * *